G. Hilgar,
Sheep Shears,
Nº 68,743. Patented Sep. 10, 1867.
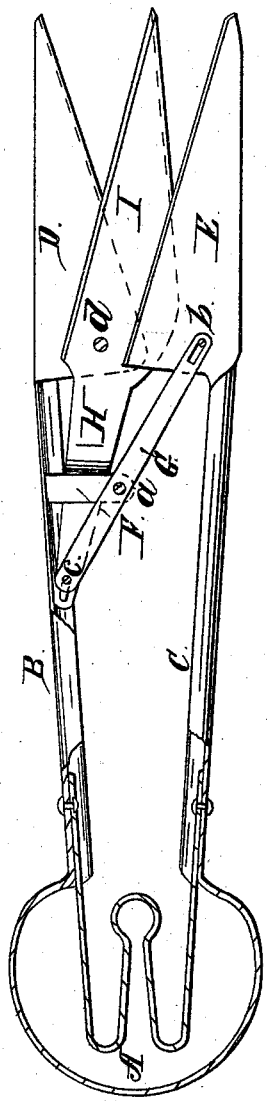
Witnesses:
Theo Tusche.
J. A. Service.
Inventor:
Geo. Hilgar,
Per Munn & Co.
Attorneys.

United States Patent Office.

GEORGE HILGAR, OF BROWNINGTON, PENNSYLVANIA.

Letters Patent No. 68,743, dated September 10, 1867.

IMPROVEMENT IN SHEEP-SHEARS.

The Schedule referred to in these Letters Patent and making part of the same.

TO ALL WHOM IT MAY CONCERN:

Be it known that I, GEORGE HILGAR, of Brownington, in the county of Butler, and State of Pennsylvania, have invented a new and useful Improvement in Sheep-Shears; and I do hereby declare that the following is a full, clear, and exact description thereof, which will enable others skilled in the art to make and use the same, reference being had to the accompanying drawings, forming part of this specification.

The drawing represents a face view of my improved sheep-shears.

This invention relates to a new manner of attaching and operating the third or centre tine of sheep-shears, and consists in so arranging all the parts that the said third tine can be easily secured to sheep-shears of ordinary construction. i. e., to such that have but two tines, and so that the said third tine can be easily removed if desired.

To one of the arms is attached a stud, on which a lever is pivoted, which connects the opposite arm or cutter with the inner end of the centre cutter. The latter is pivoted to that cutter from the shank of which the aforesaid stud projects.

A represents the spring of ordinary sheep-shears, and is formed by or between the two arms B and C of the same, on the ends of which the cutters D and E are respectively formed, as is clearly shown in the drawing, and as ordinary sheep-shears are usually made. From the shank B of the cutter D projects, not far from the junction between the said cutter and shank, a stud, F, towards the opposite shank, being about half as long as the distance at that place between the two shanks. To the end of the stud or bar F, is pivoted, by a pin, $a$, a lever, G, of which one, the longer, arm is pivoted to the cutter E, near to its inner end, by means of a pin, $b$. The other, shorter, end of the lever G, and the end of the shank H, are slotted, as shown, to allow the free motion of all the parts, and to allow the difference of the distance between the pins $b$ and $c$ and the pin $a$, which is occasioned by the rotation of the lever around its pivot $a$, while the points $b$ and $c$ turn on altogether different centres. The cutter I is held between the outer cutters D and E, and the points will always be in the centre, or equally apart from the points of D and E.

Old shears can be easily converted into three-tined shears by means of my invention, and the centre tine can be easily removed by springing the ends of the lever G off the pins $b$ and $c$, and by removing the pin $d$.

What I claim as new, and desire to secure by Letters Patent, is—

The manner herein shown and described of attaching the central cutter I to and connecting it with the ordinary cutters D and E, by means of the pin $d$, lever G, and stud F, or its equivalent, all made as set forth.

GEORGE HILGAR.

Witnesses:
 S. E. COURT,
 JOHN W. RALSTON.